Oct. 15, 1968 S. A. ROSS 3,405,475

FISH LURE

Filed Sept. 1. 1965 4 Sheets-Sheet 1

INVENTOR.
STEPHEN A. ROSS

BY Charles S. Penfold
ATTORNEY

INVENTOR.
STEPHEN A. ROSS
BY
Charles S. Penfold
ATTORNEY

INVENTOR.
STEPHEN A. ROSS

BY Charles S. Penfold

ATTORNEY

Oct. 15, 1968 S. A. ROSS 3,405,475

FISH LURE

Filed Sept. 1, 1965 4 Sheets-Sheet 4

INVENTOR.
STEPHEN A. ROSS
BY Charles S. Penfold
ATTORNEY

United States Patent Office 3,405,475
Patented Oct. 15, 1968

3,405,475
FISH LURE

Stephen A. Ross, 3920 Indiana, Fort Wayne, Ind. 46807
Filed Sept. 1, 1965, Ser. No. 484,288
15 Claims. (Cl. 43—42.08)

ABSTRACT OF THE DISCLOSURE

A fish lure formed substantially of channel shape and adapted for disposition transverse to the direction of movement in water, comprising a bottom portion, an upturned front wall provided with a forward extension, and an upturned rear wall, the front wall and the forward extension each being provided with an aperture, the rear wall being provided with retaining means for a hook, and a hook having its shank engaged with the rear wall retaining means and its eye extended through the front wall aperture and positioned relative to the aperture in the forward extension to receive a line attaching device through both the eye and the aperture in the forward extension.

The subject invention relates to fishing tackle and more particularly is directed to improvements in artificial lures or baits.

One of the principal objects of the invention is to provide a body and an assortment of elements or components which may be readily operatively connected or associated with the body in various ways whereby to obtain different forms of lures or assemblies.

More particularly, one of the objects is to provide a body which is preferably generally of channel shape and adapted for disposition substantially transverse to the normal forward direction of its travel in use. The channel includes a lower or bottom portion, an upturned front well or portion provided with a forwardly extending inclined continuation or offset, and a rear upturned wall or portion disposed substantially parallel to the front wall.

A specific object of the invention is to provide the forwardly extending continuation of the body with an aperture through which a line or different forms of line attaching devices may be extended.

A significant object of the invention is to provide the rear wall of the body with a plurality of means whereby different elements, such as bucktails, rinds, spinners, hooks, and the like may be readily detachably received or connected thereto.

An important object of the invention is to provide different forms of hook units or assemblies embodying improved principles of design and construction.

Another important object is to provide a setup in which certain of the means provided on the rear wall of the body are spaced apart and constitute receiving means for receiving or accommodating spaced portions of at least one of the hook units disclosed herein whereby to stabilize the unit and locate its barbs in upturned forwardly converging positions. The front wall of the body is preferably provided with an opening through which an eye of the aforesaid hook unit is extended for attachment to a line attaching device, the latter of which may also be connected to the forwardly extending continuation or offset of the body.

A particular object of the invention is to provide a hook unit which comprises a pair of elongate shank portions which are engaged throughout their lengths and joined by an eye, and a pair of offset or downturned divergent shank portions terminating in upturned forwardly extending curved converging portions provided with barbs. This hook unit is unique in that the elongate engaged shank portions of the unit can be readily extended longitudinally through the body and mouth of a live or artificial creature and so that the rear extremity of the creature will be disposed or held between the barbs.

Another object is to provide a hook unit similar to the one above described in which the shanks include a pair of divergent portions joined by an eye and a pair of substantially parallel portions constituting continuations of the divergent portions.

An additional object of the invention is to provide a hook assembly or unit which is comprised of a plurality of interconnected hooks, for example, two or three in which the eye of one hook is connected to the curved portion of an adjacent hook and so that, if desired, a natural or artificial worm can be threaded onto the hooks in various ways to promote continuity in the assembly, while allowing relatively free movement between the hooks and between the hooks and worm to enliven the motion of the assembly in the water.

A further object of the invention is to provide a lure body in which the line attaching means assists in promoting weed deflection as well as improving relative motion between it and the body of the lure.

Additional attributes and advantages of the invention will become apparent after the description hereinafter set forth is considered in conjunction with the drawings annexed hereto which exemplifies several embodiments of the structure.

In the drawings:

FIGURES 1 through 8 exemplify a first embodiment or lure structure;

FIGURE 9 depicts a top view of a lure comprising a body, a different form of a hook unit, and a line attaching means connecting the body and unit, with a minnow being carried by the hook unit;

FIGURE 10 is a side elevational view of the lure shown in FIGURE 9;

FIGURE 11 is a view of the hook unit constituting a component of the structure shown in FIGURE 9;

FIGURE 12 is a transverse section taken through the body of the artificial minnow depicted in FIGURES 9 and 10 showing a preformed longitudinally extending opening therein whereby to facilitate reception of the shanks of the hook unit;

Figure 1:
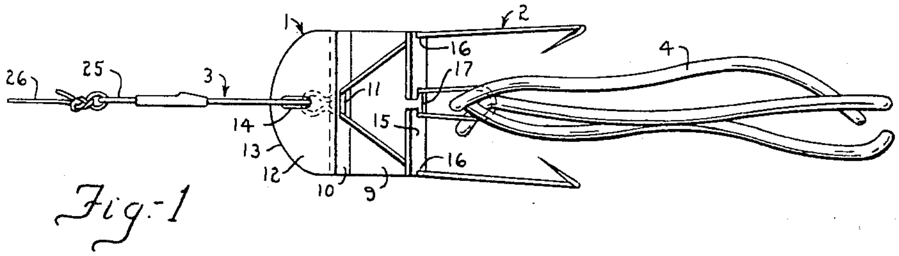
FIGURE 1 is a top view of a lure showing a line attaching device connected to a body and a hook unit for holding these elements detachably assembled, including attraction means, simulating worms, disposed for movement between shanks of the hook unit.
Figure 2:
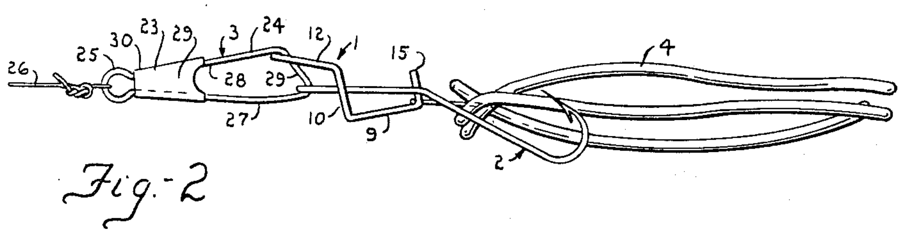
FIGURE 2 is a side elevational view of the assembly depicted in FIGURE 1.
Figure 3:
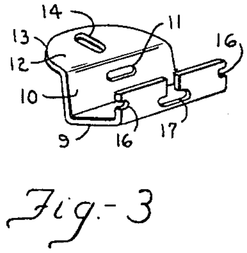
FIGURE 3 is a perspective view of a body constituting a component of the complete lures shown in FIGURES 1 and 5.
Figure 4:
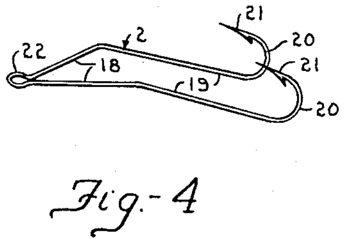
FIGURE 4 illustrates a hook unit constituting a component of the complete lures shown in FIGURES 1 and 5.
Figure 7:
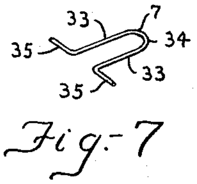
FIGURES 7 and 8 depict a pair of different forms of fasteners, either of which may be utilized to connect any one of the above attraction means to the lure body.
Figure 8:
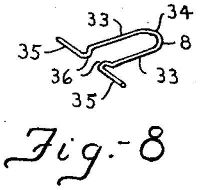
Figure 5:
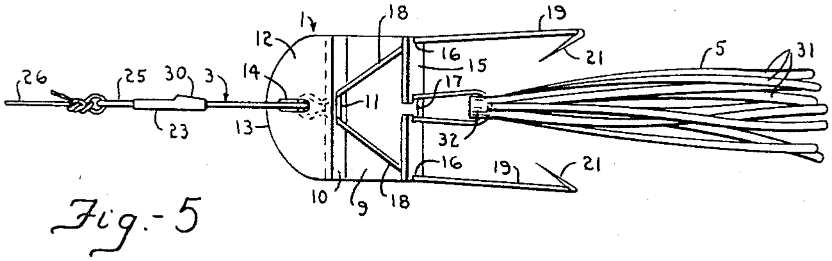
FIGURE 5 is a top view of a lure corresponding to that illustrated in FIGURE 1, except for showing an attraction means comprised of a tapered bunch of relatively flexible trailing members secured to the body between the shanks of the hook.
Figure 6:
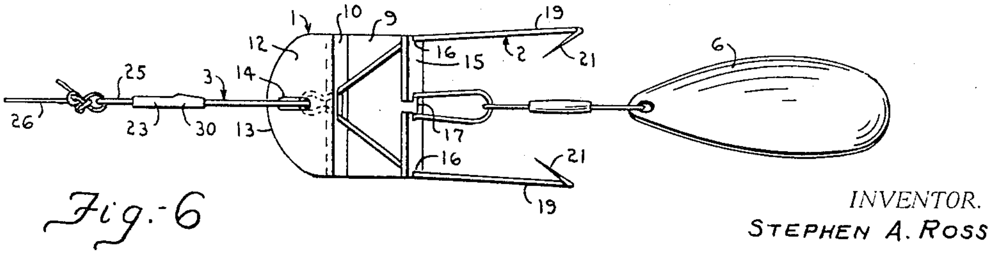
FIGURE 6 is a top view similar to FIGURES 1 and 5 illustrating an attraction means in the form of a spinner connected to the body for movement.
Figure 9:
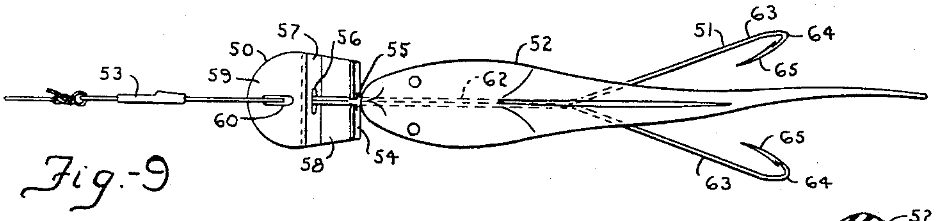
FIGURES 9, 10, 11 and 12 illustrate a modified form of lure.
Figure 11:
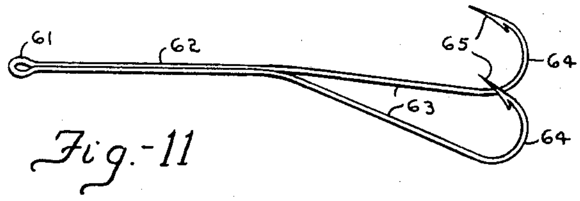
Figure 12:
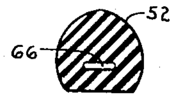
Figure 13:
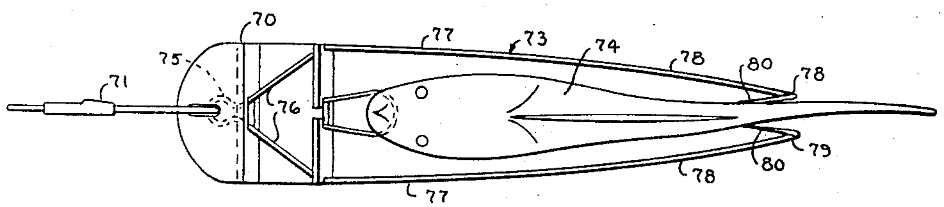
Figure 14:
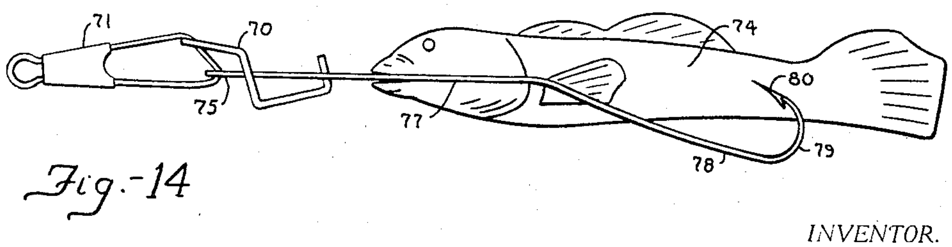
Figure 15:
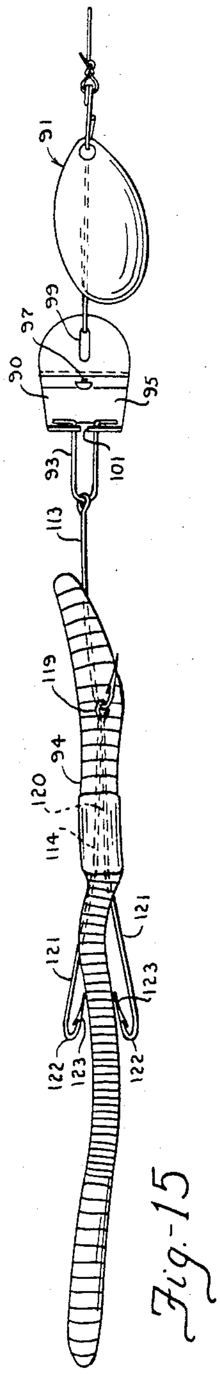
Figure 16:
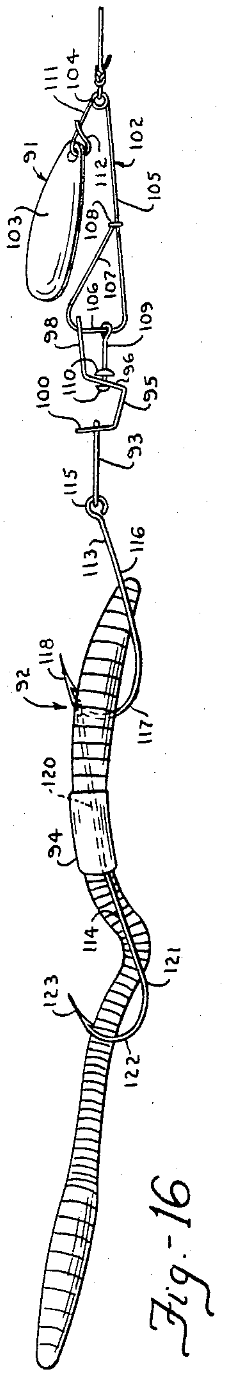
Figure 17:
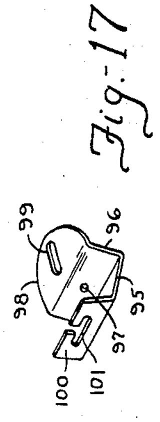
Figure 18:
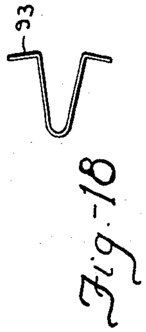
Figure 19:
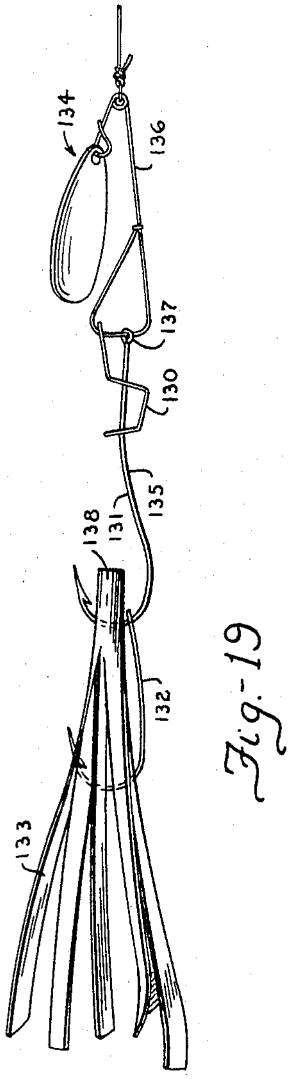
Figure 20:
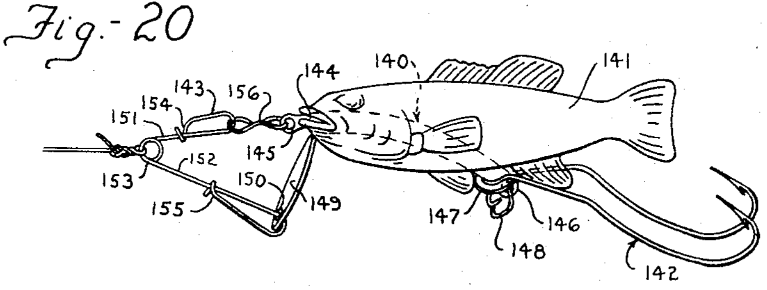
Figures 21, 22, 23:
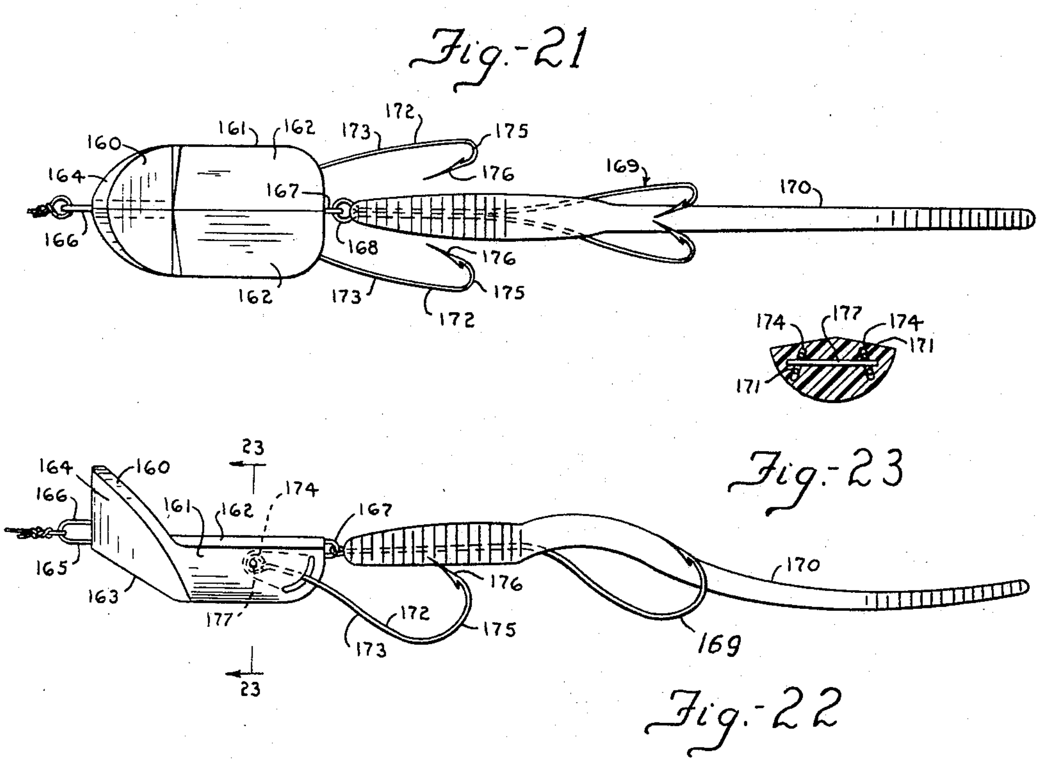
Figure 24:
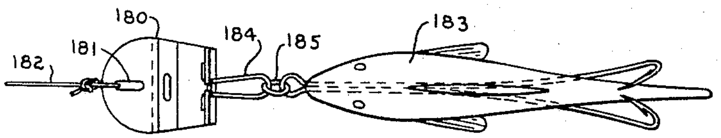

FIGURES 13 and 14 respectively illustrate top and side views of another embodiment or modified lure, showing a hook unit different from those shown in FIGURES 4 and 11, with a minnow connected to the body for movement with respect thereto and between shanks of the hook unit;

FIGURES 15 through 18 depict a modified form of lure;

FIGURES 15 and 16 respectively illustrate top and side elevational views of another modification or embodiment of a lure showing a different form of line attaching means and mode of connecting it to a lure body and a unique hook assembly or unit operatively connected to the body, the hook assembly comprising a plurality of hooks connecting together in a generally chain-like arrangement for supporting a natural or artificial worm;

FIGURE 17 is a perspective view of a body constituting a component of the lure shown in FIGURES 15 and 16;

FIGURE 18 is a top view of a fastener, similar to the fasteners shown in FIGURES 7 and 8, for attaching the hook assembly to the body;

FIGURE 19 is a side elevational view of an additional embodiment or lure structure showing a hook assembly different from that shown in FIGURES 15 and 16, operatively connected to a body in a different way, and with attraction means similar to that shown in FIGURE 5 connected to the hook assembly;

FIGURE 20 is a side elevational view of a further form of lure showing an elongate member extending through a minnow, with a hook unit and a weedless device operatively connected to the member;

FIGURES 21, 22 and 23 are directed to another form of a lure;

FIGURE 21 is a top view of the lure showing a unique form of body provided with two hook assemblies which are operatively connected to the body for movement in different ways;

FIGURE 22 is a side elevational view of the lure of FIGURE 21;

FIGURE 23 is a transverse section taken substantailly on line 23—23 of FIGURE 22; and FIGURE 24 is a top view of still another form of lure showing a body like that in FIGURE 9, with a hook and minnow unit and a line connected to the body in different ways.

Referring first to the structure of the invention embodied in the lure exemplified in FIGURES 1 through 8 of the drawing, numeral 1 generally designates a body, 2 a hook unit, 3 a line attaching device and 4, 5 and 6, different forms of attraction means secured to the body by either the fasteners 7 and 8 shown in FIGURES 7 and 8.

The body 1 may be designed and constructed in various ways and from any material desired. As depicted, it is preferably generally channel in shape and comprises a bottom or lower substantially horizontal wall 9, an upturned or vertical front wall 10 provided with an aperture or slot 11 having a forwardly extending inclined continuation or lip 12 provided with a curved frontal edge 13 and a slot or opening 14. The body also comprises an upturned or vertical rear wall 15 disposed in parallel relation to the front wall and provided with a pair of outer receiving means preferably in the form of notches 16 for receiving portions of the hook unit and centrally disposed receiving means preferably in the form of a T-slot 17 for receiving either of the fasteners 7 and 8.

The hook unit 2 is unique in design and construction and includes a pair of resiliently flexible relatively movable shanks or sides, each shank comprising an inner straight portion 18, an offset outer straight portion 19 having a curved portion 20 provided with a barb 21. It will be observed that the inner portions 18 are joined together by an eye 22 for maintaining them in a normally divergent relationship and the outer portions 19 in parallel relation so that the curved portions 20 and barbs 21 are inturned upwardly and forwardly as shown.

The hook unit 2 is preferably detachably connectable to the body 1 in a manner whereby the divergent portions 18 extend through the aperture 11 in the body and the parallel portions 19 are disposed in the notches 16. The relationship of the aperture 11 and the receiving means 16 is preferably such that the divergent portions 18 of the hook unit are angularly arranged or inclined with reference to the bottom wall 9 of the body and the parallel portions 19 extend downwardly and rearwardly with reference to the body, with the barbs 21 pointing inwardly and forwardly as evidenced in FIGURE 2.

The hook unit 2 is preferably detachably held assembled with the body of the lure by the device 3, the latter of which is in the form of a conventional fastener of the safety pin type. This device comprises a channel fitting 23 and a generally U-shaped resiliently flexible member 24 having an eye 25 for attachment to a line 26 and a pair of normally divergent legs 27 and 28 which are joined together by an angularly disposed bridge or connecting portion 29. The leg 27 is anchored in one side of the fitting 23 and the leg 28 is adapted for detachable reception in a receiving means 30 formed at the opposite side of the fitting. More particularly, the hook unit, due to its resiliently flexible character, may be readily attached to the body by spreading its shanks apart for snap reception in the notches 16 and inserting the eye 22 through the slot 11 in the front wall 10, whereupon the leg 28 of the device 3, previously separated from the means 30, is inserted upwardly through the eye 22 and through the slot 14 so that the components of the lure will more or less assume the positions illustrated in FIGURES 1 and 2 with the divergent portions 18 of the hook unit and the rear wall 15 of the body generally forming a triangular arrangement. If desired, the eye 22 can be inserted through the slot 11 prior to manipulating the portions 19 into the notches 16.

Attention is directed to the fact that the divergent legs or portions of the attaching device 3 are disposed in a vertical plane and that the frontal curved edge 13 of the lure body is disposed in a horizontal plane which intersects the plane formed by the legs. The legs and edge separately and in combination with one another serve to deflect the lure away from weeds and other foreign objects away from the lure when the latter is pulled through water and the curved edge 13 also assists in promoting travel of the lure in the water and through weeds, reeds, lily-pads, etc., and the front wall 10 and forwardly extending portion 12 more or less serve in assisting the lure to aquaplane or move in an inclined forward direction when pulled through water, depending on the speed of retrieve. In fact, substantially all of the components specifically described above are inclined generally forwardly to promote aquaplaning and turbulence of the lure in the water for the purpose of attracting fish thereto. The lure when pulled through the water may be caused to wiggle from side to side and this at least in part is achieved by the resistance offered by the front wall and lip of the lure body and partly by the fact that the bottom wall or lower portion of the body carries sufficient weight below the center of gravity and below the line of pull. It will be noted that the relationship of the portion 12, legs of the device 3 and the hook unit is also preferably such that the eye 22 of the unit is disposed under and inset with respect to the frontal edge 13 of the lure and that the hook unit is disposed in a generally angular or inclined position with respect to the body as evidenced in FIGURE 2.

The attraction means 4 is preferably in the form of worms and the attraction means 5 in the form of a bunch of longitudinally flexible members 31 carried by a head 32, whereas the attraction means 6 is in the form of a conventional spoon. These different forms of attraction means may be readily attached to the body 2 by utilizing either of the fasteners 7 and 8, as shown in FIGURES 7 and 8. More specifically in this respect, each of these fasteners is preferably generally U-shaped and resiliently flexible in character and includes a pair of resiliently flexible relatively movable legs 33 joined together by a curved connecting or bridge portion 34 and a pair of offsets 35. The fastener 8 is different from the fastener 7 to the extent that it is provided with a pair of receiving means 36 formed by bending the fasteners at the junctions between the legs and the offsets. Either of the fasteners, after being attached to the attraction means, may be assembled with the body by contracting and inserting the legs into the stem of the T-slot 17 and then allowing the legs to expand into the cross of the slot with the offsets 35 engaging with the frontal surface of the rear wall 15. The receiving means 35 of the fastener 8 are shaped to receive the ends of the marginal edges of the cross of the T-slot and thereby offer a better locking connection between the fastener and body. The attraction means, as shown, are located generally along the medial line of the lure and are substantially equally spaced from the parallel portions of the hook unit. The fasteners are of such a character that a multiplicity of various forms of different items such as hooks and attraction means may be easily and quickly secured to the lure body.

Attention is directed to the fact that the continuation or lip 12 is protected on its forward motion from weeds and foreign objects in the water by the triangular shaped line attaching device so that the lure will wiggle or wobble to cause the lip to slide away from weeds and foreign objects.

The lure exemplified in FIGURES 9 through 12 of the drawing includes a body 50 and a hook unit 51 carrying an attraction means in the form of an artificial minnow 52 and a device 53, corresponding to the device 3, for holding the components assembled. The body 50, except for having a rearwardly extending rear wall 54 provided with a slot 55 is substantially the same as the body 2 described above. The slot 55 is of a character similar to a slot 56 provided in a front wall 57 of a body. The body also includes a bottom wall 58 and a forwardly extending continuation 59 provided with a longitudinal slot 60.

Figure 10:
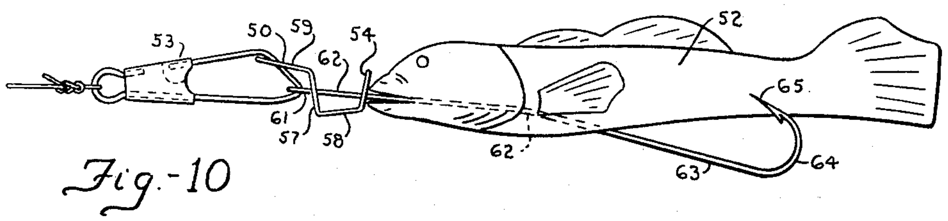

The hook unit 51 is unique in design and construction and includes a pair of shanks joined together by an eye 61. The shanks include elongate engaged straight portions 62, a pair of divergent offset portions 63 and inturned curved portions 64 carrying barbs 65. The artificial minnow 52 may be provided with an elongate medial opening as indicated at 66 for the straight portions 62 of the hook or, if desired, the eye 61 and straight portions can be forced forwardly through the minnow, due to the material of which the minnow is made. In any event, the straight portions 62 of the hook unit are preferably of a length to extend in the minnow and so that exposed portions will project forwardly of the head of the minnow in order that the eye and the exposed portions can be inserted forwardly through the slots 55 and 56 in the body to locate the eye forwardly of the front wall and below the forwardly extending portion 59 so that a leg of the device 53 can be inserted through the slot 60 and the eye for detachably connecting or holding the components assembled as depicted in FIGURES 9 and 10. It will be observed that portions of the divergent portions 63 of the hook unit and the straight portions 62 are adapted for disposition in the minnow, the purpose of which is to support and stabilize the position of the minnow relative to the unit. It should also be observed that portions of the divergent portions extend under a rear extremity or tail portion of the minnow and that portions of the curved portions and barbs are inclined inwardly and forwardly and straddle or embrace the minnow, all for the purpose of deflecting the lure away from weeds or other objects in water as the lure is pulled therethrough.

The lure illustrated in FIGURES 13 and 14 utilizes a body 70 corresponding to the body 2, a device 71, a different form of hook unit generally designated 73 and a minnow 74 like the minnow 52 shown in FIGURES 9 and 10. The hook unit 73 is unique in design and construction and comprises an eye 75, a pair of relatively short divergent portions 76, a pair of convergent portions

77 disposed in the same general plane as the divergent portions 76 and a pair of offset or depending converging portions 78 which constitute continuations of the portions 77. The portions 78 carry curved portions 79 provided with barbs 80 which are generally inturned forwardly for straddling and more or less engaging the rear extremity or tail portion of the minnow. The minnow may be connected to the body by using either of the fasteners 7 and 8 and the hook unit may be attached to the body in a mode substantially corresponding to the procedure in assembling the body 1 and hook unit 2 as described above. It will be observed that the sides of the hook unit 73 extend along the sides of the minnow as well as thereunder and in straddling relation thereto, all for the purpose of rendering the lure substantially weedless. It should be further observed that the minnow is relatively free to move or wiggle between the sides of the hook unit since this unit does not extend through the minnow as illustrated in FIGURES 9 and 10.

The lure exemplified in FIGURES 15 through 18 comprises a body 90, a combined spinner and line attaching device generally designated 91 and a hook assembly generally designated 92 which is connected to the body by a fastener 93 and carries an attraction means in the form of an artificial worm 94. More particularly, the body 90 is similar to the body shown in FIGURES 9 and 10 and includes a bottom wall 95, a front wall 96 provided with an aperture 97 and a forwardly extending continuation 98 provided with a slot 99 and a rear wall 100 provided with a T-slot 101 for receiving the fastener 93 in a mode corresponding to the fasteners shown in FIGURES 7 and 8.

The device 91 includes a line attaching member 102 and an attraction means in the form of a spinner 103. The member 102 is of a resiliently flexible character and includes a coil spring eye 104 for attachment to a line as shown, an elongate straight shank 105 extending from the eye and provided with a generally right angular offset 106 having a continuation 107 provided with a catch 108 for detachably receiving the shank portion 105, so that the continuation and offset may be readily threaded through the slot 99 and an opening provided in a fitting 109, the latter of which has its rear end loosely secured in the aperture 97 so that a pair of spaced abutments 110 on the fitting are located on opposite sides of the front wall 106 as shown in FIGURE 16. The member 102 also includes a straight portion 111 disposed in an acute angular relationship to a shank portion 105 and is provided with a catch 112 affording detachable connection with the spinner. The relative sizes and spacing between the portions of member 102, spinner, and fore part of the body and their connections and relationship with respect to one another assist in substantially deflecting the lure away from weeds and foreign objects in water.

The hook unit 92 is considered to be unique in that it is comprised of a pair of hooks or units 113 and 114 of different lengths, which are interconnected together in a novel way. More specifically in this respect, the hook unit 113 is of a conventional character and includes an eye 115 and a shank 116 having a curved portion 117 carrying a barb 118. The hook 113 is adapted for detachable connection with the body through the fastener 93 and the hook unit 114 has an eye 119 through which the curved portion 117 of the hook unit 113 loosely extends, a pair of engaged elongate straight shank portions 120 and a pair of divergent offset straight portions 121 having curved portions 122 carrying barbs 123. The worm 94 may be attached to the hooks in various ways but, as shown, portions of the shank 116 and curved portion 117 of the hook are disposed in the fore extremity of the worm and the shank portions 120 of the unit extend through the worm with the offset portions 121 and curved portions 122 being inclined downwardly and rearwardly in stabilizing relationship with a free portion of the worm therebetween. It will be observed that the curved portion 122 and barbs 123 are inturned upwardly and forwardly. This unique hook assembly offers a setup whereby hooks and a worm are relatively free for producing a relatively likelike motion to the lure.

The lure illustrated in FIGURE 19 includes a body 130, a unique hook assembly comprising a pair of hooks 131 and 132 of different lengths carrying an atttraction means 133 and a combined attraction means and spinner assembly generally designated 134 corresponding to the means 91 above referred to. The body 130 is similar to the body 50, above referred to, and the hook 131 which is longer than the hook 132 has a curved shank 135 which extends through slots provided in the front and rear walls of the body so that a portion of a flexible line attaching member 136 of the means 134 may be threaded through an eye 137 of the hook for detachably holding the hook assembly, body and means 174 assembled. A curved portion and barb of the hook 131 are preferably threaded through a head 138 of the attraction means 133 and the curved portion and barb of the shorter hook 132 are preferably arranged in a trailing position in the attraction means for general universal movement relative to the inner hook 131.

The lure illustrated in FIGURE 20 comprises a supporting structure generally designated 140 for supporting a minnow 141, a hook unit 142 and a line attaching device generally designated 143. The structure 140 preferably comprises a curved or arched support 144 which extends through the minnow and is provided with the opening 145 at its fore end and an aperture 146 at its rear end. The hook unit 142 substantially corresponds to the hook unit 2, above referred to, and is detachably connected to the support 144 by extending a rear exposed end of this support successively through an eye 146 of the hook unit and a washer 147 and then inserting a fastener or clip 148 through the aperture 146 in a manner whereby the hook unit may move relative to the support in the trailing position shown. The washer 147 serves to prevent the support from being pulled forwardly through the minnow and additionally serves to stabilize movement of the hook unit. The support 144 is provided with a fixed spoon 149 which extends forwardly and downwardly from the fore end of the support and head of the minnow and is provided with an aperture 150.

The unique line attaching device 143 is of a resiliently flexible character and comprises a pair of divergent legs 151 and 152 which are joined by a coiled spring line attaching eye 153. The legs are respectively provided with catches 154 and 155 for detachable connection with the support 144 and the spoon 149. More specifically in this regard, the hook is secured in the aperture 150 and the leg 151 which is shorter than the leg 152 is preferably connected to the support by a link 156, which has its ends respectively disposed in the opening 145 of the support and the catch 154. The legs are preferably arranged in acute angular relationship and define in combination with the spoon, a triangular arrangement or formation which serves to render the lure substantially weedless.

The lure exemplified in FIGURES 21, 22 and 23 comprises an elongate body having a frontal portion 160 and a rearwardly extending substantially semi-cylindrical portion 161 having a pair of upper surfaces 162 which slope downwardly from a medial line of the body. The frontal portion has an inclined undersurface 163 and a front curved surface 164. The body is provided with a centrally disposed longitudinally extending opening and an elongate member 65 is slidable in this opening and provided with a line attaching loop 166 at its fore end and a loop or hook 167 at its rear end for detachable connection with an eye 168 of a hook unit generally designated 169 which carries a worm 170. The line and hook unit shown may be readily attached to the slidable member by merely reciprocating the latter.

The hook unit 169 substantially corresponds to the unit 114 shown in FIGURES 15 and 16 and extends through a fore extremity of the worm 170 and so that a pair of curved portions and barbs of the hooks may straddle the worm in a mode such as that above described.

The body is also provided with a pair of rearwardly extending internal recesses 171 disposed an opposite sides of the longitudinal axis of the body as best shown in FIGURE 23. A pair of hooks 172 have shanks 173, eyes 174, and curved portions 175 provided with barbs 176. A cross member 177 in the body extends through the eyes 117 and serves to pivotally connect the hooks to the body and opposed surfaces of the recesses assist in guiding the hooks for movement in planes toward one another when pivoted upwardly and in planes away from one another when pivoted downwardly. It will be observed that the curved portions and barbs of the hooks are inturned and straddle the hook unit 169 and worm 170 as evidenced in FIGURE 21.

In view of the foregoing, it will be apparent that the forepart of the body and the relative difference in sizes and locations of the hook unit 149 and hook 172 serve to provide an organization whereby the unit and worm may freely wobble between the hooks 172 and the latter may individually and jointly pivot upwardly or downwardly, all of which provides a lively acting lure which is substantially weedless.

The lure depicted in FIGURE 24 of the drawing comprises a body 180 substantially corresponding to the body 2 and has a slot 181 through which a line 182 is tied and a hook and minnow assembly generally designated 183 which is detachably connectible to the body by a fastener 184 through a ring or fitting 185. The assembly 183 substantially corresponds to the hook and minnow assembly shown in FIGURE 21.

In view of the above, it will be manifest that a member of different lures are exemplified which embody one or more various unique components and assemblies conducive to fishing. More particularly, the lures are all substantially weedless, non-revolving, and can be caused to wiggle on or beneath the surface of water at any desired depth by controlling the speed of the retrieve. Also, the various items illustrated and others not shown may be assembled in a great number of different combinations without utilizing tools. In other words, a fisherman can quickly and easily assemble the components to obtain a particular lure without going to the expense of keeping a large inventory of complete lures for different kinds of fishing.

Having thus described my invention, it is obvious that various other modifications may be made in the same without departing from the spirit of the invention and, therefore, I do not wish to be understood as limiting myself to the exact forms, constructions, arrangements, and combinations of parts herein shown and described.

I claim:

1. A member constituting the body of an artificial lure, said member having a bottom wall, an apertured upturned front wall provided with a forwardly extending portion to which a line or other element may be connected, an upstanding rear wall disposed in spaced relation to said front wall and provided with retaining means, and means whereby a hook structure having a shank and an eye may be supported on the body with said eye extended through the aperture and a portion of the shank engaged in said retaining means and extending rearwardly of said rear wall.

2. A member for use as a body of an artificial lure, said member having an upturned front wall having a frontal extension provided with a first means whereby to facilitate connection of a line thereto and a second means on said front wall spaced from said first means whereby to facilitate connection of a hook unit, and said member also having a rear wall provided with retaining means whereby to facilitate connection of said hook unit.

3. A member for use as a body of an artificial lure, said member being substantially of channel shape with the channel being adapted for use in positions transverse to the direction that the member is adapted to travel in water, said member having a front wall, a bottom wall, and a rear wall, said front wall being provided with a forwardly extending portion facilitating connection of a line thereto, and said front wall also being provided with means whereby to facilitate connection of a hook thereto.

4. A generally channel shape body for the purpose described comprising a bottom wall, an apertured upturned front wall provided with a forwardly extending continuation provided with a frontal edge formed for weed deflecting purposes and with means for facilitating connection of a line thereto, a structure comprising an eye disposed adjacent said line connection means and a hook having a shank extending from said eye and through said aperture, means connecting said eye to said continuation, and said body having an upturned rear wall having retaining means engaging said shank for stabilizing said structure.

5. In combination: a body of substantially channel shape having a bottom wall, a front wall provided with a forwardly extending continuation and a rear wall, said front wall being provided with an opening and said continuation with an aperture and said rear wall being provided with receiving means, and a hook unit having an eye located in front of said front wall and divergent portions extending through said opening and portions disposed in said receiving means, a line attaching device extending through said aperture and through said eye for detachably holding said body and hook unit assembled.

6. The combination defined in claim 5, in which said continuation is disposed in one plane and said line attaching device comprises a pair of divergent portions which are disposed in a second plane which intersects said one plane.

7. The combination defined in claim 5, in which said continuation is provided with a curved frontal surface and said line attaching device is provided with a pair of divergent portions which generally straddle said continuation and in combination with said frontal surface serve as deflecting means.

8. An artificial lure comprising a body having an upturned front wall provided with an opening therein and a forwardly extending portion, an upstanding rear wall provided with cooperating means, a hook structure having shank means engaging said cooperating means and extending through said opening and an eye disposed forwardly of said front wall, and a device connected to said forwardly extending portion and to said eye for maintaining said body and hook structure assembled.

9. The lure defined in claim 8, in which said device is provided with divergent portions which serve to deflect weeds away from said body when the lure is pulled through water.

10. The lure defined in claim 8, in which said forwardly extending portion of said body is disposed in a plane, and said device includes a pair of divergent portions which are disposed in a plane which is substantially perpendicular to said first-mentioned plane.

11. In combination: a channel-shaped body having its channel disposed transverse to its movement through water, a hook structure carried by said body and comprising a pair of spaced hooks having shanks disposed in a straddling engaging relation to said body, and a line attaching device loosely connected to said body and to said hook structure for holding said body and hook structure assembled.

12. The combination defined in claim 11, in which said device includes a pair of divergent legs for deflecting weeds away from said body.

13. An artificial lure comprising a body having a bottom portion, an apertured front wall provided with a forwardly extending continuation, a rear wall provided with receiving means, a hook unit comprising a pair of hooks having shanks and an eye extending through said aperture, curved portions on said shanks provided with barbs, said eye of said hook unit being connected to said forwardly extending continuation and portions of said shanks being disposed in said receiving means for stabilizing said unit with respect to said body.

14. In combination: a body having a bottom wall, a front wall provided with an opening, a rear wall provided with a pair of spaced side receiving means, a hook structure comprising an eye extending through said opening, a pair of shank portions connected to and extending from said eye disposed in said side receiving means, said shank portions being provided with continuations which are disposed in a substantially parallel relationship and extend rearwardly appreciable distances from said rear wall and terminate in curved portions and barbs which are inturned upwardly and forwardly, and means for connecting said eye to said body at a location forwardly of said front wall.

15. The combination defined in claim 14, in which said rear wall is provided with centrally disposed receiving means, including means receivable in said last-mentioned receiving means for supporting a lure.

References Cited

UNITED STATES PATENTS

| | | | |
|---|---|---|---|
| 2,481,710 | 9/1949 | Arndt | 43—42.52 X |
| 2,507,454 | 5/1950 | Nelson | 43—42.52 X |
| 2,575,626 | 11/1951 | Isaac | 43—42.08 |

SAMUEL KOREN, *Primary Examiner.*

D. J. LEACH, *Assistant Examiner.*